(12) United States Patent
Fisk et al.

(10) Patent No.: US 10,137,044 B2
(45) Date of Patent: Nov. 27, 2018

(54) PATIENT SUPPORT APPARATUS WITH SENSOR ASSEMBLY

(71) Applicant: Hill-Rom Services, Inc., Batesville, IN (US)

(72) Inventors: Brandon P Fisk, Greensburg, IN (US); Nicole Johannigman, Greensburg, IN (US); Brian J Hoffman, Lawrenceburg, IN (US); Frank E Sauser, Cincinnati, OH (US); Jason B Grace, Cincinnati, OH (US); David L Bedel, Oldenburg, IN (US); Brian A Kirkish, Algonquin, IL (US); Jason M Gilreath, Cincinnati, OH (US)

(73) Assignee: Hill-Rom Services, Inc., Batesville, IN (US)

( * ) Notice: Subject to any disclaimer, the term of this patent is extended or adjusted under 35 U.S.C. 154(b) by 393 days.

(21) Appl. No.: 15/151,828

(22) Filed: May 11, 2016

(65) Prior Publication Data

US 2016/0331616 A1    Nov. 17, 2016

Related U.S. Application Data

(60) Provisional application No. 62/161,478, filed on May 14, 2015.

(51) Int. Cl.
*A61G 7/057* (2006.01)
*G01K 1/16* (2006.01)

(52) U.S. Cl.
CPC ........... *A61G 7/05746* (2013.01); *G01K 1/16* (2013.01); *A61G 2203/46* (2013.01)

(58) Field of Classification Search
CPC ...................................... A61G 7/057
USPC ............................. 5/689, 713, 911
See application file for complete search history.

(56) References Cited

U.S. PATENT DOCUMENTS

| | | | | |
|---|---|---|---|---|
| 4,609,854 A | * | 9/1986 | Yamamoto | A61G 7/05746 318/471 |
| 5,402,542 A | * | 4/1995 | Viard | A61G 7/05746 5/421 |
| 5,441,477 A | | 8/1995 | Hargest et al. | |
| 6,073,289 A | | 6/2000 | Bolden et al. | |
| 6,353,948 B1 | | 3/2002 | Bolden et al. | |
| 6,574,813 B2 | | 6/2003 | Bolden et al. | |
| 2013/0296769 A1 | | 11/2013 | Howell et al. | |
| 2014/0201922 A1 | | 7/2014 | Sauser et al. | |
| 2014/0259427 A1 | | 9/2014 | Klink et al. | |
| 2014/0259428 A1 | | 9/2014 | O'Keefe et al. | |

* cited by examiner

*Primary Examiner* — Fredrick C Conley
(74) *Attorney, Agent, or Firm* — Barnes & Thornburg LLP (57) ABSTRACT

According to the present disclosure, a patient support system includes a patient support surface having an air fluidizable section and a sensor assembly. The sensor assembly is configured to detect a temperature within the air fluidizable section. The sensor assembly includes a housing with an interior, a processor within the interior of the housing, a thermal conductor, and a thermal insulator.

17 Claims, 5 Drawing Sheets

PATIENT SUPPORT APPARATUS WITH SENSOR ASSEMBLY

PRIORITY CLAIM

This application claims priority under 35 U.S.C. § 119(e) to U.S. Provisional Application No. 62/161,478, filed May 14, 2015, which is expressly incorporated by reference herein.

BACKGROUND

The present disclosure relates to patient support apparatuses, such as hospital beds, for example, which include active support surfaces. More specifically, the present disclosure relates to patient support apparatuses that provide an air fluidized support surface at the interface between the apparatus and the patient, and that detect conditions of the support surface to control operating characteristics of the patient support apparatus based on the detected conditions.

Patient support apparatuses, such as hospital beds, for example, include active support surfaces for interface with a patient's body. The beds may include an air fluidizable section, in which air is distributed through a bulk of fluidization material to form a two-phase fluidized support surface, providing near weightless support to the patient's body.

When a patient is recovering from trauma to the skin, for example trauma from receiving skin grafts, reducing shear and frictional forces at the interface of the patient's body with the support surface improves the conditions for healing the skin. Fluidized support surfaces provide minimal shear and frictional force to the skin of the patient occupying the support surface. The temperature and humidity of the air within the fluidizable section can be controlled to provide therapeutic relief and comfort according to the patient's condition.

SUMMARY

In one aspect of the present disclosure, a patient support system includes a patient support device including an air fluidizable section and a sensor assembly. The air fluidizable section includes a basin containing fluidization material for creating a two-phase support surface for patient support by distribution of pressurized fluid through the fluidization material. The sensor assembly is configured to detect a temperature within the air fluidizable section. The sensor assembly includes a housing defining an interior space, the housing being coupled to a wall of the air fluidizable section. The sensor assembly also includes a processor positioned within the interior space of the housing, a thermal conductor, and a thermal insulator.

In some embodiments of the patient support system, the processor is located between the thermal conductor and the thermal insulator, within the interior space.

In some embodiments of the patient support system, the wall has an aperture through which the housing extends.

In some embodiments of the patient support system, the processor, while being within the interior space of the housing, is positioned within the air fluidizable section of the patient support device.

In some embodiments of the patient support system, the thermal insulator contacts the processor and extends at least partially outside of the air fluidizable section.

In some embodiments of the patient support system, a heat sink is adjacent the thermal conductor.

In some embodiments of the patient support system, the housing has a first end positioned within the air fluidizable section and a second end positioned outside of the air fluidizable section, and the processor is located within the first end adjacent to each of the thermal conductor and the thermal insulator.

In some embodiments of the patient support system, the processor having at least one solid-state device.

According to another aspect of the present disclose, a sensor assembly for detecting temperature of a fluid flow within an air fluidizable section for creating a two-phase support surface for patient support of a patient support system includes a housing. The housing defines an interior space and is coupled to a wall of the air fluidizable section of the patient support system. The sensor assembly further includes a processor positioned within the interior space of the housing, a thermal conductor, and a thermal insulator.

In some embodiments of the sensor assembly, the wall is a bottom portion of the air fluidizable section.

In some embodiments of the sensor assembly, the processor is located between the thermal conductor and the thermal insulator, within the interior space of the housing.

In some embodiments of the sensor assembly, the wall includes an aperture through which the housing extends.

In some embodiments of the sensor assembly, the processor, while being within the interior space of the housing, is positioned within the air fluidizable section of the patient support device.

In some embodiments of the sensor assembly, the thermal insulator contacts the processor and extends at least partially outside of the air fluidizable section.

In some embodiments, the sensor assembly includes a heat sink adjacent the thermal conductor.

In some embodiments of the sensor assembly, the housing includes a first end positioned within the air fluidizable section and a second end positioned outside of the air fluidizable section, and the processor is located within the first end adjacent to each of the thermal conductor and the thermal insulator.

In some embodiments of the sensor assembly, the processor includes at least one solid-state device.

Additional features alone or in combination with any other feature(s), including those listed above and those listed in the claims and those described in detail below, can comprise patentable subject matter. Others will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
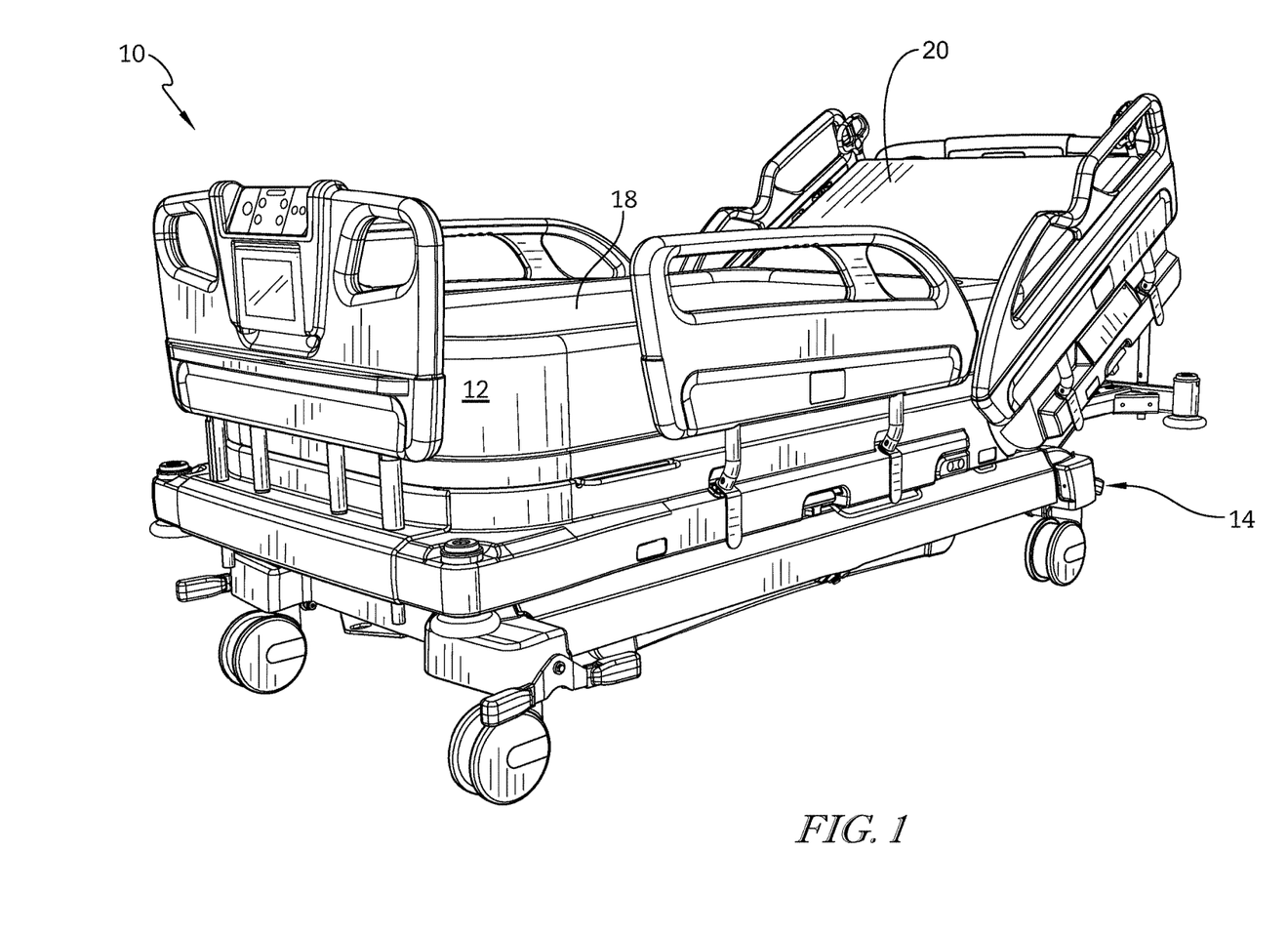
FIG. 1 is perspective view of an patient support apparatus including an a patient support surface with an air fluidizable section supported by a base.
Figure 2:
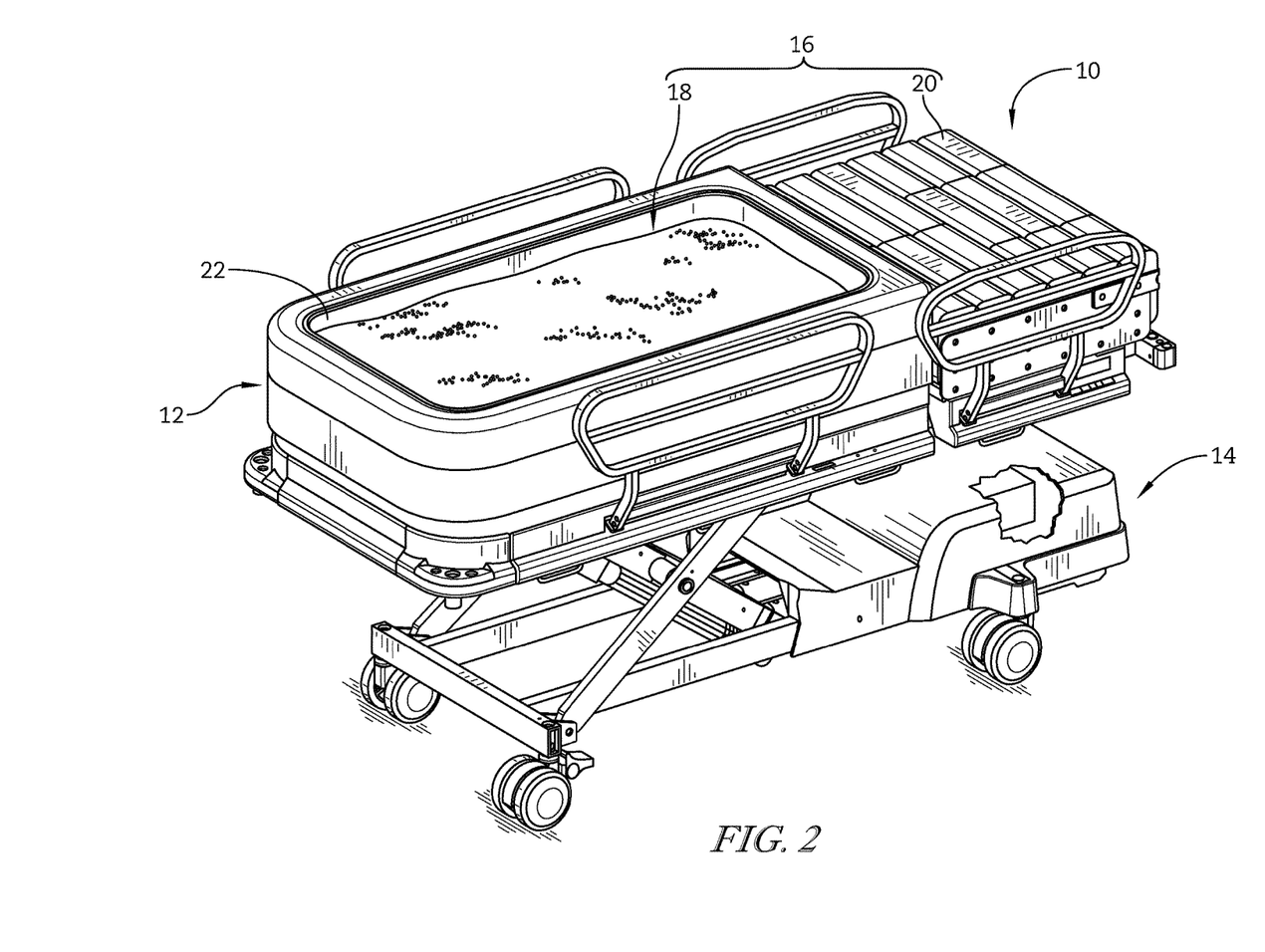
FIG. 2 is perspective view of another illustrative patient support system including a patient support surface having an air fluidizable section of less than the entire patient support surface.

An illustrative patient support system embodied as a hospital bed 10 is shown in FIGS. 1 and 2. The bed 10 includes patient support device 12, supported by a base 14, the patient support device 12 having a patient support surface 16 provided by an air fluidizable section 18. As discussed below, the air fluidizable section 18 provides a patient support surface 16 which is configured to support the body of a patient occupying the bed 10 with minimal friction and shear force to the patient's body. In the illustrative embodiment shown in FIGS. 1 and 2, the patient support surface 16 includes the air fluidizable section 18 for supporting one portion of the patient's body, and a mattress section 20 for supporting another portion of the patient's body. In other embodiments, the patient support surface 16 may be defined entirely by the air fluidizable section 18 for supporting all portions of a patient's body.

Figure 3:
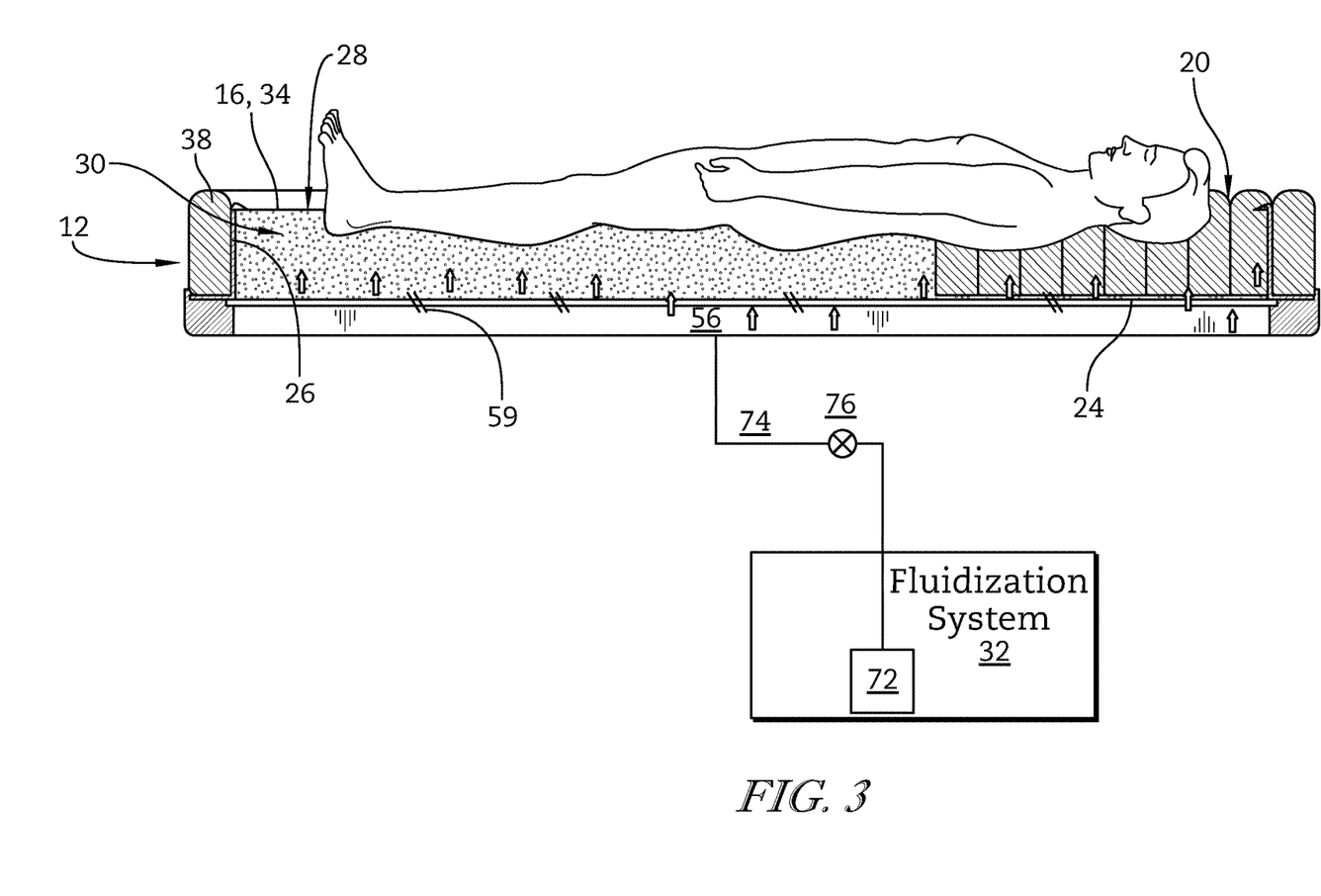
FIG. 3 is an illustrative diagram of a patient occupying the patient support surface of FIG. 1 and a fluidization system of the air fluidizable section of the patient support surface.

As can be seen in FIG. 3, the patient support device 12 includes the patient support surface 16 for supporting a patient's body. The patient support surface 16 is provided by the air fluidizable section 18 which includes a basin 22 having a diffuser board 24, sidewalls 26, and an air permeable fluidization cover 28. The basin 22 contains fluidization material 30 through which pressurized air can be directed at sufficient conditions for use as fluidization air to form a fluidized bed such that the mixture of fluidization air and fluidization material 30 exhibits fluid-like flow properties and forms a two-phase fluidized support surface. Conditions sufficient to form such a fluidized bed, including a relatively homogenous mixture of fluidization air and fluidization material 30, the pressurized air having at least a pressure, velocity, and density, sufficient to achieve fluidization of the fluidization material 30 according to at least the fluidization material's volume, mass, density, shape, surface condition, distribution within the basin 22, and the loading to the patient support surface 16.

As discussed in more detail below and as shown in FIG. 3, the fluidization system 32 sends pressurized air through the fluidization material 30 contained within the basin 22 of the air fluidizable section 18. When the fluidization system 32 is operated to fluidize the fluidization material 30, the fluidization material 30 forms a two-phase fluidized support surface 34 supporting the air permeable fluidization cover 28 and creating the patient support surface 16 supporting the patient's body. The fluidized support surface 34 helps prevent formation of bed sores and is well-suited for treatment of patients with skin grafts by minimizing shear and frictional forces at the patient support surface 16. The fluidized support surface 34 also permits humidity-controlled and temperature-controlled fluidization air to be in contact with the patient's skin by permeating the fluidization cover 28, providing comfortable and healing conducive environments in contact with the skin.

Sensing the temperature within the air fluidizable section 18, including its contents, allows improved control of the conditions of the fluidization air and fluidization material 30. The configuration of a sensor assembly 36 to provide rapid detection, accuracy, and precision, while reducing error stackup enables the apparatus to quickly achieve and maintain preferred conditions at the patient support surface 16.

Figure 4:
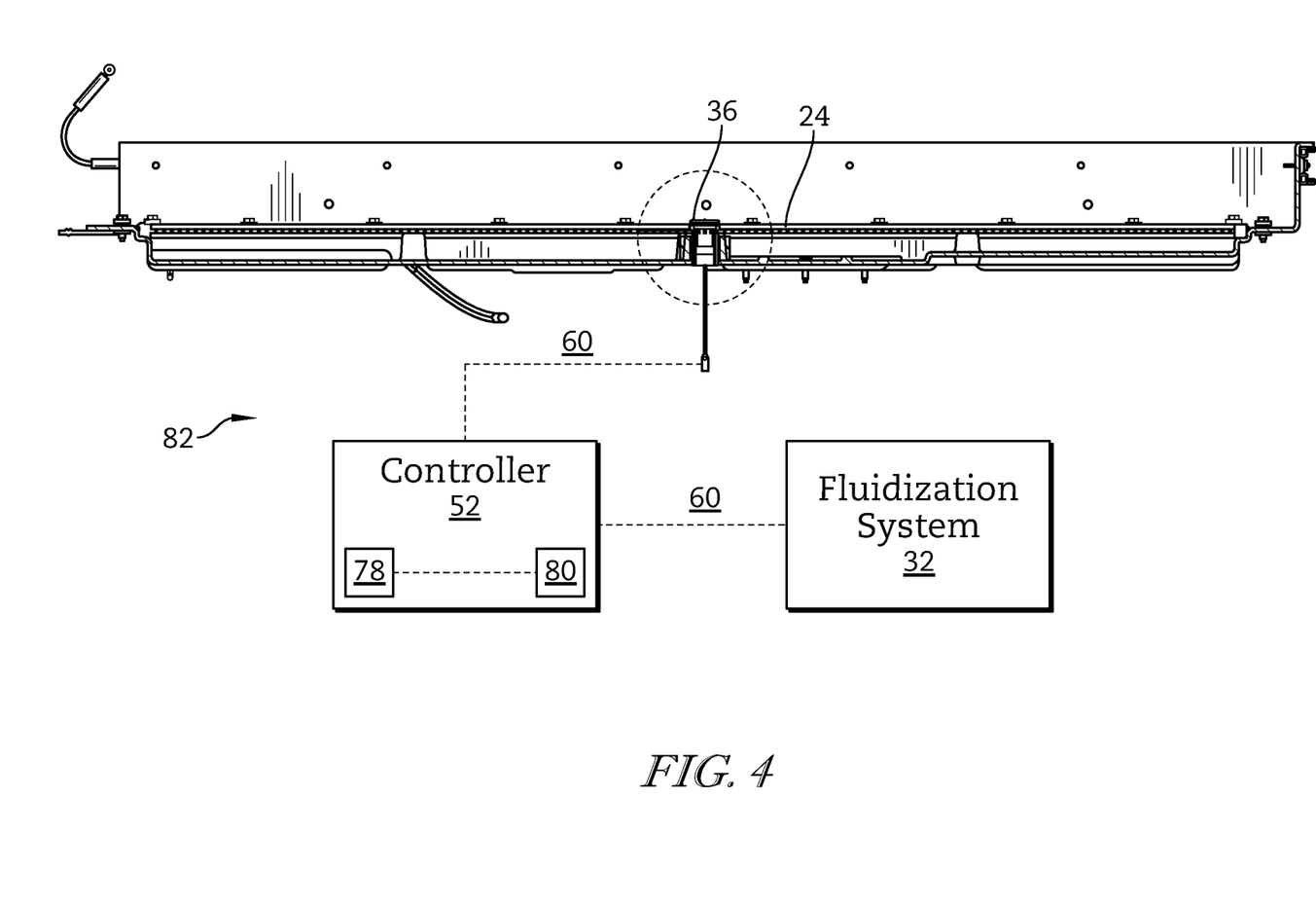
FIG. 4 is an plan view of a portion of the air fluidizable section of the patient support surface of FIGS. 1 and 3 having a patient support apparatus control system including a sensor assembly.
Figure 5:
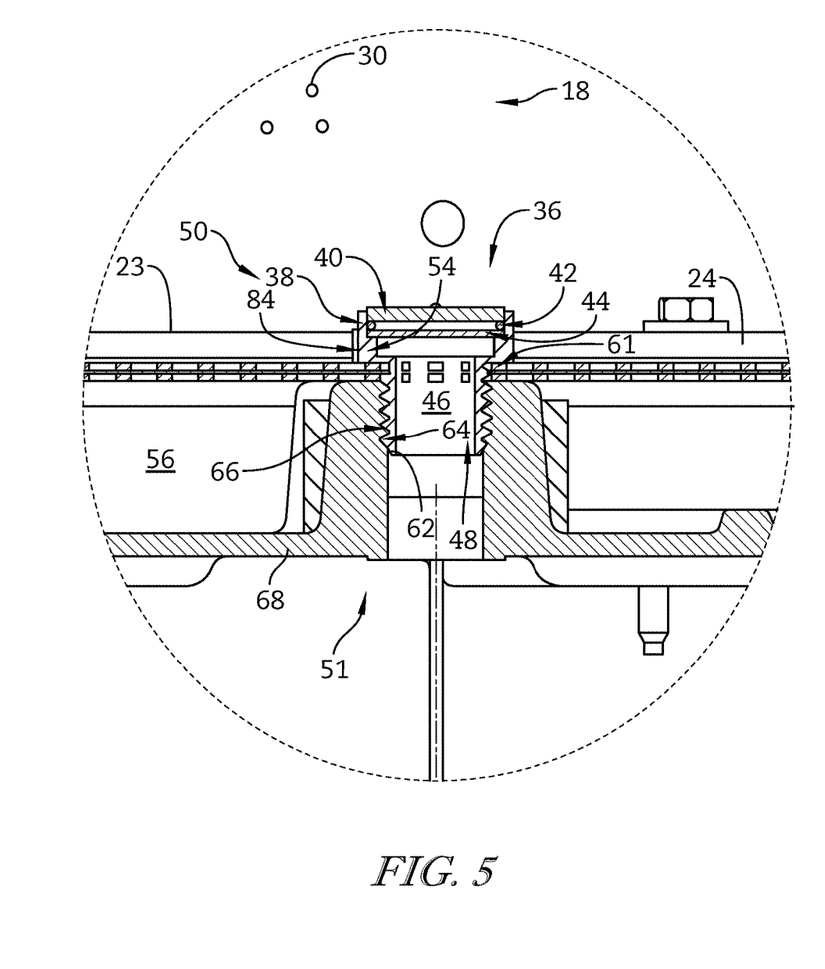
FIG. 5 is a detailed view of the sensor assembly of FIG. 4 positioned within the air fluidizable section of the patient support apparatus of FIGS. 1 and 3.

As shown in FIGS. 4 and 5, the sensor assembly 36 is coupled to the diffuser board 24 of the basin 22 of the air fluidizable section 18. The sensor assembly 36 is exposed to the environmental conditions within the air fluidizable section and risks undesirable heat conduction to surrounding support structures which, when not mitigated, can affect operation of the sensor assembly 36. The configuration of the sensor assembly 24, described in detail below, mitigates the effects of heat on the sensor assembly components.

In the illustrative embodiment shown in FIG. 5, the sensor assembly 36 includes a housing 38, a heat sink 40, a thermal conductor 42, a processor 44, and a thermal insulator 46. The housing defines an interior space 48 within which the processor 44 is positioned. By providing an integrated circuit as the processor 44 and positioning the processor 44 within the interior space 48 of the housing 38 and inside of the air fluidizable section 18, the precision, accuracy, and responsiveness of the sensor assembly 36 can be improved while reducing stackup error. This in turn translates into improved operation of the fluidization system 32 and overall control of the conditions at the patient support surface 16.

As shown in FIG. 5, the heat sink 40 is disposed at the first end 50 of the housing 38 in contact with the fluidization air and fluidization material 30 within the air fluidizable section 18. The heat sink 40 is configured for thermal communication with the fluidization material 30 and the fluidization air within the air fluidizable section 18 to quickly attain the temperature thereof. The heat sink 40 adjacently contacts the thermal conductor 42 to transmit heat energy received from the air fluidizable section 18 to the processor 44 through the thermal conductor 42. In the illustrative embodiment, the heat sink is formed of a steel sheet. In other embodiments, the heat sink 40 may be any suitable material, and may be formed as a portion of the housing and or as encased within the thermal conductor, and or any combination thereof. In other embodiments, the sensor assembly 36 may be embodied as having no heat sink 40 and another component, for example the housing 38, may be in contact thermal contact with each of the air fluidizable section 18 and the processor 44.

Also shown in FIG. 5, the thermal conductor 42 is configured to quickly transmit heat from the heat sink 40 to the processor 44. The thermal conductor 42 is a thermal epoxy attaching the heat sink 40 to the processor 44 and providing a layer of thermally conductive adhesive between and in adjacent contact with each of the heat sink 40 and the processor 44 to conduct heat from the heat sink 40 to the processor 44. In other embodiments, the thermal conductor 42 may be one or more of any suitable filler or potting material, and or combinations thereof, for attaching the heat sink 40 to the processor 44 while conducting heat therebetween. For example, the thermal conductor may be a thermal-cycle resistant black epoxy compound having the following typical properties—viscosity (@25° C. cps): 60,000; Hardness (Shore D): 90; Coef. of Therm Exp. (in/in/° F.×10E-5): 1.4; Therm. Cond. (W/mK): 2.16; Heat Distortion Temp. (° C.): 155; Dielectric Strength (volts/mil): 485; Volume Resistivity (Ω-cm): 1.5×10E15; Dielectric Constant (@ 60 Hz): 5.6.

Also shown in FIG. 5, the processor 44 is configured to receive heat from the heat sink 40 transmitted through the thermal conductor 42, and to produce a signal indicative of the temperature within the air fluidizable section 18. The processor 44 receives heat from the heat sink 40 by contact with the thermal conductor 42. The close proximity of the heat sink 40 and processor 44 separated by thermal conductor 42 allows efficient heat transfer providing precision, accuracy, and responsiveness in sensing and controlling the temperature within the air fluidizable section 18. Based on the heat received through the thermal conductor 42, the processor 44 generates a signal indicative of the temperature within the air fluidizable section 18 for communication to the controller 52, as described below. The processor 44 is seated on a ledge 54 of an inside portion of the housing, in contact with the thermal conductor 42 on a first side, and in contact with the thermal insulator 46 on an opposite side. The processor 44 may be configured for use with various signal conditioning hardware and or software to achieve suitable system control and responsiveness.

In the illustrative embodiment shown in FIG. 5, the processor 44 is positioned inside the air fluidizable section 18 lying at least partially beyond a top side 23 of the diffuser board 24, within the housing 38. The processor 44 is within the interior space 48 of the housing 38 on the first end 50 of the housing 38. In the illustrative embodiment, the processor 44 is a silicon-based integrated circuit outputting at least one signal for communication to a controller 52. An example of a suitable processor 44 includes part no. ADT7320 from Analog Devices, Inc., of Norwood, Mass. In some embodiments, the processor may be embodied as any of a microprocessor, microcontroller, microchip, digital signal processor, printed circuit board and or assembly, pin grid array, RAM, ROM, flash memory devices and or any other integrated arrangement of resistors, capacitors, diodes, transistors, converters and or any other solid-states devices to achieve circuit function, including any combinations thereof.

Also shown in FIG. 5, the thermal insulator 46 is positioned adjacent the processor 44 within the interior space 48 of the housing 38. The thermal insulator 46 is configured to minimize heat transfer with the surrounding areas. The thermal insulator 46 extends through the housing 38 from the first end 50 to the second end 51. The thermal insulator 46 is illustratively embodied as RTV3145 silicone sealant available from Dow Corning Inc., of Midland, Mich. In some embodiments, any other suitable thermal insulator may be used.

Wiring 58 connects to the processor 44 for communication of one or more signals generated by the processor 44. The wiring 58 extends from the processor 44 through the thermal insulator to the second end 51 of the housing. The wiring 58 communicates the signals generated by the processor 44 with communication links 60 for transmission to the controller 52. In the illustrative embodiment, the wiring 58 has physical connection with communication links 60 and having a 4 wire connection. In other embodiments, the wiring 58 may have wireless communication with communication links 60 and or with controller 52, may have any suitable number of wiring connections for communication.

In the illustrative embodiment of FIG. 5, the diffuser board 24 of the basin 22 has an aperture 84 through which the housing 38 extends. A first end 50 of the housing 38 is positioned inside of the air fluidizable section 18 on one side of the diffuser board 24, and a second end 51 of the housing 38 is positioned outside of the air fluidizable section 18 on the other side of the diffuser board 24. In the illustrative embodiment, the housing 38 is constructed of plastic having thermal insulation characteristics on the second end 51. In other embodiments, the housing may be any suitable material providing rigidity for mounting the assembly and minimizing heat transfer with surrounding support components while permitting temperature detection by the heat sink 40.

The housing 38 insulates the interior from outside temperatures minimizing any offset onto the processor 44. On the first end 50 the housing 38 has first diameter larger than a second diameter of another portion of the housing 38 on the first end 50. On the first end 50, the housing 38 has a radial seating surface 61 orthogonally between the first diameter with the second diameter for seating the housing against a support 68. On the second end 51, the housing 38 has diameter equal to the second diameter of the first end 50 with an outer surface 62. The outer surface 62 having threads 64 for engagement with threads 66 of the support 68 for coupling the sensor assembly 36 to the diffuser board 24, the seating surface 61 abutting the support 68 to seat the sensor assembly 36 when the threads 64,66 are fully engaged. In the illustrative embodiment, the sensor assembly 36 is a single sensor assembly 36 being generally cylindrical. In other embodiments, the sensor assembly 36 may be one or more sensor assemblies within the same or different housings, may be located at various places within the air fluidizable section 18, may be any suitable shape, and may be coupled to the diffuser board 24 by any suitable attachment means.

Returning to the illustrative embodiment as shown in FIG. 3, the fluidization system 32 includes subcomponents including a fluid pressure source 72, fluid distribution tubing 74, valve 76, heater and cooler (not shown), and supporting hardware and peripherals for generating, conditioning, controlling, and providing pressurized fluid at the fluidization conditions, discussed below, to the air fluidizable section 18. The fluid pressure source 72 generates pressurized air for communication through the valves 76 and tubing 74 to a plenum 56 for use as fluidization air. The plenum 56 is a compartment defined partly by diffuser board 24 of the basin 22 of the air fluidizable section 18. In other embodiments, the fluidization system 32 may include one or more fluid pressure sources 72, fluid distribution tubes 74, valves 76, heaters and or coolers of any suitable type and configuration for generating, conditioning, controlling, and providing pressurized fluid to the air fluidizable section 18 at the fluidization conditions, discussed below.

In the illustrative embodiment of FIG. 2, the fluidization system 32 is mounted to the base 14 of the bed 10 in close proximity to the plenum 56. In other embodiments, the fluidization system 32 may be mounted to any suitable portion of the bed 10, or may be supported direction on the floor with suitable connections to the components mounted on the bed 10.

The diffuser board 24 includes fluid channels 59 configured to distribute the pressurized air from the plenum 56 to achieve fluidization of the fluidization material 30 to create the two-phase fluidized support surface 34. The fluid channels 59 are fluid passageways formed through the diffuser board 24 of the basin 22 and configured to distribute the pressurized air to support fluidization of the fluidization material 30 without permitting ingress of the fluidization material 30 into the plenum 56. In the illustrative embodiment, the fluidization material 30 is a bulk of silicon beads and the fluid channels 59 are covered with an air permeable fabric on the underside of the diffuser board to prevent ingress of the beads into the plenum 56. In other embodiments, the fluidization material 30 may be any material or materials suitable for providing the fluidized support surface 34 of the patient support surface 16 and the channels may be shaped, sized, and or otherwise configured to prevent ingress of the fluidization material into the plenum 56.

Returning to the illustrative embodiment of FIG. 4, the patient support apparatus includes a patient support apparatus control system 82 in communication with the fluidization system 32. The control system 82 includes controller 52, the sensor assembly 36, and communication links 60. As described in detail above, the sensor assembly 36 is configured to determine a temperature of the fluidization material 30 for communication of at least one signal to the controller 52 indicating the temperature of the air fluidizable section including the fluidization air and fluidization material 30 contained therein. The sensor assembly 36 sends at least one signal generated by the processor 44 and indicative of the temperature of the air fluidizable section 18, to the controller 52 through communications link 60.

Also shown in FIG. 4, the controller 52 includes a memory device 78 and a processor 80 for executing instructions stored on the memory device 78. The controller 52 receives at least one signal via from the sensor assembly 36 via communication links 60 indicating the temperature of the air fluidizable section 18. The processor 80 executes the instructions stored in the memory device 78 based on the signal received from the sensor assembly 36, and generates at least one command signal indicating required operable conditions of the subcomponents of the fluidization system 32 to provide pressurized air to achieve the fluidization conditions which include the conditions of pressurized air required to support fluidization of the fluidization material 30 within the air fluidizable section 18 and to create the fluidized support surface 34.

In the illustrative embodiment, the required operable conditions of the subcomponents include valve positions, pressure source speed, heater and or cooler temperature levels, and or any other subcomponent control conditions to provide pressurized air at the fluidization conditions to the air fluidizable section 18. The controller 52 communicates the at least one command signal to the fluidization system 32, via links 60, to instruct the fluidization system 32 to achieve require operable conditions of the subcomponents. In other embodiments, the fluidization conditions may include humidity control and or temperature adjustment based on detected humidity levels at the patient support surface 16 and or in the ambient environment, and or user defined preferences communicated to the controller 52 via a user interface.

In the illustrative embodiment, the instructions stored on the memory device 78 include at least one algorithm for execution in the processor 80 to determine the required operable conditions of the subcomponents of the fluidization system 32. In other embodiments, the instructions may include any of a look up table, chart, or any combination thereof. The controller 52 may communicate with other equipment to support diagnostic function, debugging, enhanced features and or communications, and or updated design of the instructions stored on the memory device 78.

In the illustrative embodiment, the sensor assembly 36 is mounted to the diffuser board 24 of the basin 22 of the air fluidizable section 18, and the diffuser board 24 is a single component of a single layer of material. In other embodiments, the sensor assembly 36 may be mounted to any wall of the air fluidizable section 18, intermediate portion of air fluidizable section 18, and or any combination thereof. The diffuser board 24 may be a combination of multiple layers of materials and or components.

The control system 82 of the illustrative embodiment is described and depicted as a stand-alone system and including a communication port for connection of other equipment to support diagnostic function, debugging, enhanced features or communications, and or updated control design. In other embodiments, the control system 82 may be a subsystem of a master control system for the bed 10, a combined or subsystem to one or more other control systems of bed 10, may share any of hardware or software components between other control systems, and may include a wireless communication port for connection with other equipment. The control system 82 may store information on the memory device 78 regarding past, present, or predicted conditions, as indicated by signals received and or otherwise generated by the controller 52, for use by the processor 80 in executing the instructions.

Any and or all communication links 60 may be partly or wholly wired with either permanent or detachable connections, and may also comprise wireless communication, or any combination of wiring and wireless configurations.

Although certain illustrative embodiments have been described in detail above, variations and modifications exist within the scope and spirit of this disclosure as described and as defined in the following claims.

The invention claimed is:

1. A patient support system, comprising:
   a patient support device including an air fluidizable section, the air fluidizable section including a basin containing fluidization material for creating a two-phase support surface for patient support by distribution of pressurized fluid through the fluidization material, and
   a sensor assembly configured to detect a temperature within the air fluidizable section, the sensor assembly comprising:
      a housing defining an interior space, the housing being coupled to a wall of the air fluidizable section,
      a processor, the processor being positioned within the interior space of the housing,
      a thermal conductor, and
      a thermal insulator.

2. The patient support system of claim 1, wherein the processor is located between the thermal conductor and the thermal insulator, within the interior space.

3. The patient support system of claim 2, wherein the wall includes an aperture through which the housing extends.

4. The patient support system of claim 3, wherein the processor, while being within the interior space of the housing, is positioned within the air fluidizable section of the patient support device.

5. The patient support system of claim 4, wherein the thermal insulator contacts the processor and extends at least partially outside of the air fluidizable section.

6. The patient support system of claim 2, further comprising a heat sink adjacent the thermal conductor.

7. The assembly of claim 1, wherein the housing includes a first end positioned within the air fluidizable section and a second end positioned outside of the air fluidizable section, and the processor is located within the first end adjacent to each of the thermal conductor and the thermal insulator.

8. The patient support system of claim 1, wherein the processor comprises at least one solid-state device.

9. A sensor assembly for detecting temperature of a fluid flow within an air fluidizable section for creating a two-phase support surface for patient support of a patient support system, the sensor assembly comprising:
   a housing defining an interior space, the housing being coupled to a wall of the air fluidizable section of the patient support system,
   a processor, the processor being positioned within the interior space of the housing,
   a thermal conductor, and
   a thermal insulator.

10. The assembly of claim 9, wherein the wall is a bottom portion of the air fluidizable section.

11. The assembly of claim 9, wherein the processor is located between the thermal conductor and the thermal insulator, within the interior space of the housing.

12. The assembly of claim 11, wherein the wall includes an aperture through which the housing extends.

13. The assembly of claim 12, wherein the processor, while being within the interior space of the housing, is positioned within the air fluidizable section of the patient support device.

14. The assembly of claim 13, wherein the thermal insulator contacts the processor and extends at least partially outside of the air fluidizable section.

15. The assembly of claim 11, further comprising a heat sink adjacent the thermal conductor.

16. The assembly of claim 9, wherein the housing includes a first end positioned within the air fluidizable section and a second end positioned outside of the air fluidizable section, and the processor is located within the first end adjacent to each of the thermal conductor and the thermal insulator.

17. The assembly of claim 9, wherein the processor comprises at least one solid-state device.

* * * * *